Patented Aug. 16, 1932 1,871,572

UNITED STATES PATENT OFFICE

WILLIAM BURTON WESCOTT, OF DOVER, MASSACHUSETTS, ASSIGNOR TO RUBBER LATEX RESEARCH CORPORATION, OF BOSTON, MASSACHUSETTS, A CORPORATION OF MASSACHUSETTS

REENFORCED RUBBER AND PROCESS OF MAKING THE SAME

No Drawing.  Application filed April 2, 1924. Serial No. 703,782.

This invention relates to reenforced rubber and processes of making the same; and it comprises a new material particularly suitable for a shoe sole and/or heel and consisting of sheeted coagulated, but unplasticized or raw, latex rubber containing and reenforced by fiber not under tension intimately distributed therethrough, said fiber constituting a minor proportion of the whole and said material exhibiting normal rubber properties as regards extension and flexure till said fibers come under tension, thereby arresting extension and flexure, said fiber being advantageously locally greater in amount at some points in said sole or heel and said rubber being usually of greater purity than that normal to latex rubber; and it further comprises a method of making such an article wherein fiber is distributed through a bath of rubber latex in a state of incipient coagulation contained in a suitably shaped container, said latex usually having been preliminarily purified, the latex is allowed to coagulate to form a coagulum including such fiber and the coagulum is pressed and dried, the article so formed being sometimes, but not invariably, subsequently vulcanized and being sometimes provided with a face of woven material, a sheet of woven material being placed in the bath prior to coagulation; all as more fully hereinafter set forth and as claimed.

What are usually known as "plantation crepe soles" for boots and shoes are made from raw plantation rubber by building up plies of rubber crepe; that is, of sheeted and washed coagulum from rubber latex; this coagulum being otherwise untreated. In making the sole, there is as little milling or mechanical work as possible; it being an object to retain the original structure of the raw rubber as far as possible. Soles so made are extremely tough, light and resilient. They are substantially a "pure gum" mass in the sense that they consist of rubber. They are rarely vulcanized. These soles, however, in spite of their many advantages, have some disadvantages; one being a tendency to spread, and another being that after some period of use, the sole will wear smooth and is then quite slippery when wet. The normal rough surface left by the creping machine soon wears down. Again, with a sole or heel of this character, about the only way in which it can be attached to the rest of the shoe is by the use of a cement. Sewing is not practicable.

In this type of sole, it is desirable to include fiber or thread of some kind to increase the surface friction and to limit the extensibility or character of the elongation under tensile load. Incorporation of fiber into coagulated rubber mechanically is impossible without destruction of the natural structure of the crude rubber, which is desirable in this type of sole; and, further, mechanical incorporation of fiber of any substantial length into rubber by milling is impracticable, since fiber milled into crude rubber is comminuted, being reduced to a dust, if the milling is sufficiently long and thorough to give an intimate incorporation.

In the present invention, I produce soles and heels of coagulation rubber containing reinforcing fiber, the incorporation of the fiber however being prior to the coagulation of the latex; that is, prior to the production of the crude rubber which is to be used for making the sole. And I advantageously arrange things so that in the complete article the fiber is largely localized at one surface, there being, however, intimately distributed fiber, usually cotton, throughout the rest of it.

Rubber latex is a tree sap of varying composition carrying emulsified particles of caoutchouc or material which becomes "caoutchouc" after coagulation. The suspended matter in the emulsion may be here called caoutchouc. When the latex is acidulated or violently agitated, the rubber separates as a coagulum; and this coagulum is sheeted into crepe form. Usually the latex is first diluted, as this facilitates subsequent washing. Material so made is ordinary plantation crepe rubber. When latex is dried down without coagulation, it forms a gel containing, in addition to caoutchouc, all the other solids, dissolved and undissolved, of the original latex. This dry latex gel differs in many ways from the ordinary coagulated rubber.

In the present invention, I desire a material having the properties of coagulated caoutchouc, rather than one having the properties of a gelled latex. When latex is coagulated, the coagulation may, or may not, be very rapid. Ordinarily, coagulation conditions (strength of acid and the temperature) are arranged to give a reasonably rapid action. Rapid coagulation is desirable but it is very difficult to obtain any very rapid coagulation with even action. In coagulation, as stated, a certain reticulate structure develops in the rubber; this structure differing somewhat with the time employed. With the best type of structure, the serum solution and its contained solubles are readily washed out from the coagulum.

In the present invention, I place fiber in a bath of latex prior to coagulation and then coagulate the latex of the bath so as to produce an article having the desired reticulate structure of ordinary coagulated rubber, the reticulum, however, containing the fiber. The coagulum is of less volume than the bath and to minimize this shrinkage, it is desirable to have as concentrated a latex as possible; and it is advantageous to purify the latex as well. Latex may be concentrated and purified without disturbance of the emulsified state of the caoutchouc present, by careful treatment in a centrifugal machine; and in so doing, the latex may be washed with liquids which do not break the emulsion, replacing the natural serum solution, which contains proteids and carbohydrates, etc., with water containing a protective colloid. Methods of accomplishing these results are described and claimed in my copending application Serial No. 601,909.

Such purified, standardized and concentrated solutions are particularly advantageous in the present invention.

Latex, unlike the rubber "solutions" which are made with the aid of benzol and the like, is a liquid of penetrating properties, readily entering capillaries and readily entering fibrous materials. It is therefore practicable to produce, with the aid of latex, bodies of caoutchouc containing intimately distributed fiber of any length or character desired, the fiber being permeated by caoutchouc. This fact is utilized in the present invention. I immerse in a shallow bath of latex in a suitable pan-like container the right amount of fiber in the right relation thereto; conditions being so adjusted that the final coagulated article will be in sheet form, and will contain the proportion of fiber desired. The latex is feebly acidified before addition to the fiber with any convenient acid, such as acetic acid. Ordinarily, I aim to have the acidity such that full coagulation will require between 2 and 3 hours. Sometimes, latex is stabilized against coagulation by the addition of a little alkali, usually ammonia; and with such latex, the correct amount of acid is usually that which will cause the solution to just turn litmus. Some care is required in mixing the latex and the acid solution to prevent local acidity and local coagulation. The purified and standardized latices referred to ante are not so acid sensitive as ordinary latex; they do not coagulate as quickly with a given amount of acid.

In the best embodiment of my invention in producing "material for crepe soles", I so arrange conditions as to produce a final sheet having at one surface a fairly sharply defined layer rich in cotton or other fiber and with a less fiber content throughout the rest of the mass. This layer serves for sewing purposes enabling the material to take and hold stitching and to prevent spreading of the sole in use. Sometimes, I make this locally dense layer of woven material, instead of using fiber in random arrangement. Where woven fabric is used, I find it best to employ one with a napped or teased surface to give an interlock of the fabric layer with the rest of the fiber-containing sheet. Where all the fiber is to be used in random arrangement, that is, where woven fabric is not used, I usually employ batted cotton, immersing the bat in a bath of latex of the proper depth. If it be a soft bat, the cotton will tend to distribute tolerably uniformly throughout the bath and the subsequent coagulum. On the other hand, if it be a relatively dense bat, the cotton will be concentrated more at the top of the sheet; the bat tending to float. China cotton, because of its kinky nature, is best. Bat and bath are allowed to stand undisturbed until a sheet like coagulum is formed including the bat. Where a facing layer of woven material is wanted, after the bat is immersed, a sheet of such woven material, advantageously with a napped or teased lower layer, is laid in the bath. It is best to wet the cloth layer with latex first. The fibers extending downward from the napped surface mingle with the fibers of the bat, so that upon coagulation, the fiber reinforcement extends from within the woven material throughout the body of the sheet. Sometimes, in lieu of using a facing layer of woven cloth, I use two bats; the upper of relatively dense structure. And sometimes, when using a fabric of the nature of a raised and cut pile fabric, such as carpet or Turkish toweling weave, having a considerable length of surface fiber, I may dispense with any other fiber, relying entirely on the pile fabric to furnish the distributed fiber for reinforcing the rubber sheet. Generally, I adjust the depth of the latex bath so as to make the coagulum sheet not more than half-an-inch thick in the finished state, and with such a thickness, the length of pile may furnish all the fiber necessary in such a sheet.

In making rubber soles and heels under the present invention, I generally desire about 25 per cent of cotton in the form of fibers of substantial length in the body of the sheet; but in the dense surface layer, it is better to raise the proportion considerably; even as high as 75 per cent. Material containing 75 per cent of rubber and 25 per cent of distributed cotton has the general rubber properties, as contradistinguished from rubber cemented fiber.

After the coagulation is complete, I generally pass the resulting sheet between squeeze rolls, which express the latex serum and then dry the sheet; usually in a vacuum dryer. Washing of the sheet coagulum at this stage being difficult, it is advantageous for this reason, as well as others, to use a purified latex. From the sheet of material, soles and heels may be punched out.

Latex rubber formed by coagulation has great strength and toughness; a fact which is responsible for the use of the usual "plantation crepe soles". In the present article, the strength and toughness are retained and there is given the additional advantage of the presence of fiber. Sometimes, it is desirable to give the sheet or soles a very slight degree of vulcanization. When this is done, I may add to the latex, previous to coagulation or drying, a suitable amount of a suitable vulcanization agent, or agents, in amounts about equivalent to 1 percent of sulfur on the caoutchouc in the latex and vulcanize the sheet in the usual way. The vulcanizing agent may be sulfur. Accelerators may be added. Or, the coagulated sheet, being more or less porous prior to pressing, may then be vulcanized with sulfur chlorid. With a vulcanization agent present in the coagulated sheet, the sheet may be vulcanized as a whole and then individual soles cut, or the soles may be cut out and vulcanized in molds; this latter practice being particularly desirable where I wish to increase the thickness of part of the sole by adding other plies, as, for instance, in building up a heel. Where the material is to be vulcanized, in building up a heel there may be simply added to the heel section of the entire sole an added piece of cotton-reenforced rubber. Such added pieces are best without the surface dense layer previously described. Sometimes, in making the sheet I provide the dense cotton layer with eyelets or attached washers, to form seating means for nails or the like, this being in the portion which will form heels when the entire soles and heels are punched out.

One of the main advantages of the rubber sole of the present invention is the fact that the dense cotton in the surface layer gives adequate anchorage for welt stitching and provides a suitable foundation for nail retaining means in the heel section.

In applying eyelets or washers to a heel section, I sometimes attach the eyelets or washers to the cotton bat or fabric before immersion in the latex, but I usually apply the washers by means of appropriate pins, as is customary in heel molding.

Sometimes, in making cheap soles having the advantageous properties of latex rubber and the advantages of the incorporated fiber of the present invention, I employ various fillers together with the fibers. These fillers may include carbon black, comminuted rubber, etc. In so doing, I customarily raise the amount of sulfur to 2 or 3 per cent on the latex caoutchouc. In making this type of reenforced filler-containing sole, the dried gel caoutchouc is more desirable than the coagulated.

In the article of the present invention, the contained fibers are not under tension and the material is not stiff. As a matter of fact, in coagulating a body of latex in and on the fiber in a pan-like mold, the coagulum retains the shape of the pan but is of less dimensions; it shrinks. As the coagulum shrinks the fibers, so to speak, crumple up, they are not under tension. In the finished article, a pull or tension is at first resisted only by the rubber, that is, the reaction is that normal to rubber, but beyond a certain degree of extension, tension comes on the fiber and extension is arrested. The result is a peculiar type of resiliency easily perceptible on pulling the sole with the fingers. In a sole this combination of flexibility with a sharply limited extensibility is desirable.

While I have mainly discussed the use of cotton, which is the most satisfactory fiber for the present purposes, other fibers may be used, such as jute, ramie, etc. The article not being vulcanized ordinarily, heat-sensitive animal fibers, such as hair and wool, can also be used. For some purposes, tannery hair forms an excellent reenforcement.

In speaking of latex, I use the word in the present accepted meaning of a latex, such as that from Hevea trees, which will produce ordinary caoutchouc (India rubber) on coagulation.

The color, or depth of color, of the rubber soles made under the present invention varies somewhat with the character of the latex. With fresh latex, and particularly with latex which has been standardized and purified in the manner hereinbefore stated, the color may be white or very light. As the disseminated matter of the latex which becomes caoutchouc on coagulation will take up various fat-soluble dyestuffs, it is possible to produce dyed rubber soles under the present invention by putting these dyestuffs in the latex. The cotton or other fiber incorporated into the body of latex may be previously dyed, if desired, as, for instance, in making soles of a color harmonizing with the color of the shoe; dyeing of the cotton being in any of the usual ways.

In making the reenforced raw rubber sole, or "plantation crepe sole" and using batted cotton, the cotton fibers occur in the sole in random arrangement; they are distributed throughout the rubber, the several fibers being spaced and isolated from each other by intervening rubber. With distributed random fiber only, there is a limited, sharply arrested extensibility in all directions. With a concentration of fiber toward one side, to a certain extent there is a differentiation of properties between the two sides.

What I claim is:—

1. A body of coagulation rubber containing included long fiber in random arrangement and also containing fabric, said fabric being localized in the body and having threads extending into other parts of said body.

2. In the manufacture of rubber articles, the process which comprises producing a bath of latex in a state of incipient coagulation, immersing in the bath a mass of fibers in random arrangement and also placing formed fabric therein adjacent the surface of the mass of fibers.

3. A process of making a unitary sheet material adapted for use as a shoe sole which comprises preparing a shallow bath of fluid latex in a state of incipient coagulation, immersing in said bath a bat of fibers, the quantity of which is of the order of one-third of the quantity of rubber in the bath, then producing under conditions of quiescence a complete coagulation of the entire body of rubber in the latex in and around the fibers to form a composite sheet comprising rubber and fiber, wherein fiber is distributed throughout the rubber in random arrangement, individual fibers being crumpled on themselves, and individual fibers being spaced and bonded by the rubber.

4. In the process of claim 3, the step which comprises preliminarily removing non-caoutchouc constituents of the latex.

In testimony whereof, I have hereunto affixed my signature.

WILLIAM BURTON WESCOTT.